Nov. 7, 1967     V. K. PELTOLA     3,350,942
ULTRASONIC PYROMETER

Filed Sept. 15, 1964     3 Sheets-Sheet 1

INVENTOR.
Veikko K. Peltola
By Silverman & Cass
ATTORNEYS

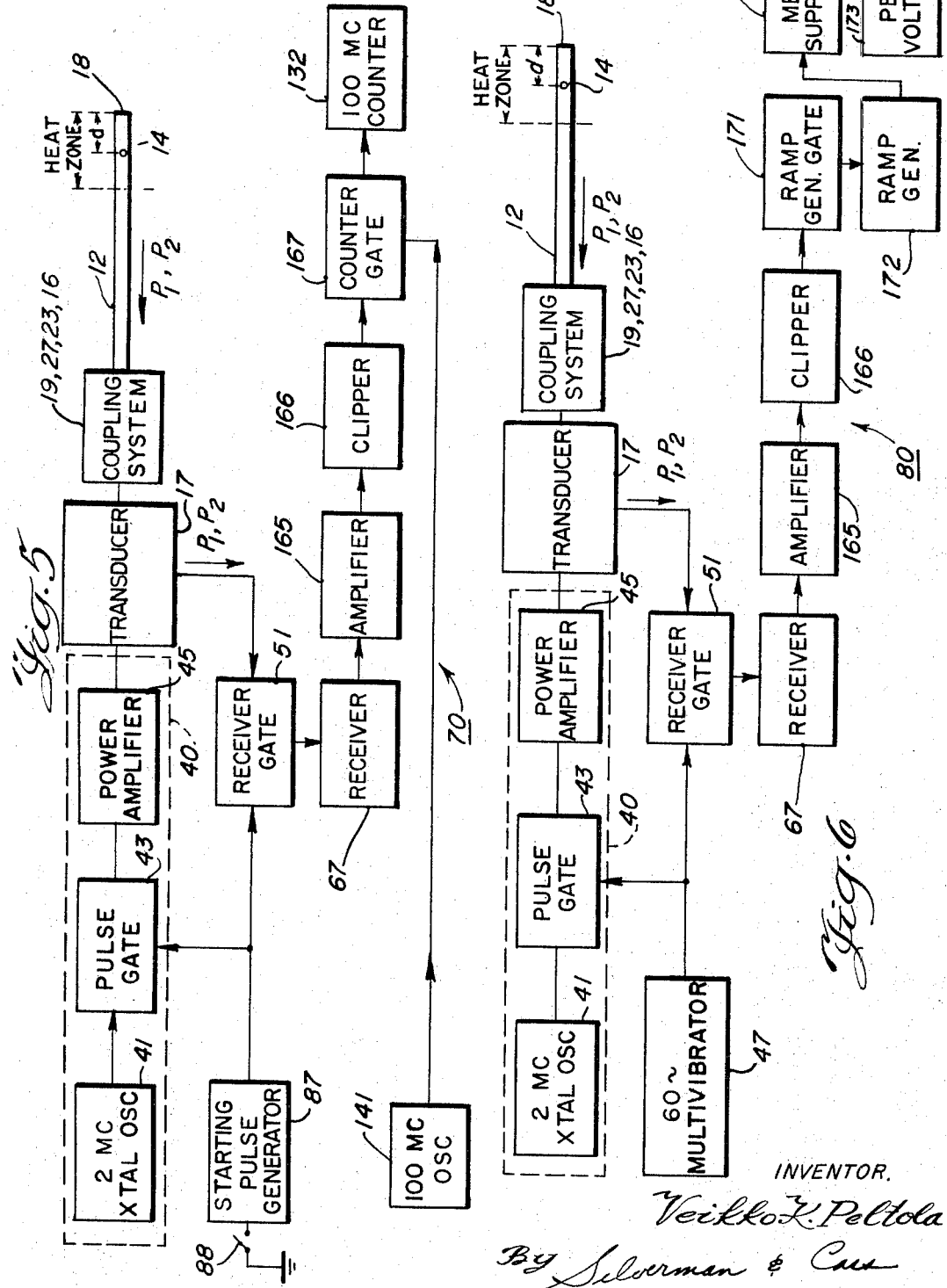

United States Patent Office 3,350,942
Patented Nov. 7, 1967

3,350,942
ULTRASONIC PYROMETER
Veikko K. Peltola, Chicago, Ill., assignor to Alnor Instruments, Division, Illinois Testing Laboratories, Chicago, Ill., a corporation of Illinois
Filed Sept. 15, 1964, Ser. No. 396,596
4 Claims. (Cl. 73—339)

ABSTRACT OF THE DISCLOSURE

A pyrometer having a solid heat sensing and acoustic responding element with a pair of cross-sectional discontinuities from which are reflected pairs of spaced acoustic signals which originated as a single pulse of electric energy.

This invention relates to temperature measurement apparatus and more particularly, in an important aspect, relates to an ultrasonic temperature measuring apparatus.

In the past, it was familiar practice to employ the well-known thermocouple for the measurement of high temperatures in the various industrial applications where such temperatures are of interest. The thermocouple, however, has been subject to some disadvantage. One of these is that the Seebeck effect, on which thermocouples depend for operation, is one which is peculiar to metals and such metals may oftentimes be expensive. Further, in high temperature ranges the metals of such a thermocouple are subject to melting and consequent destruction.

As an alternative to the thermocouple, which is destructible by high temperature, resort has been had to optical pyrometers of one sort or another in which the illumination spectrum of a source whose temperature is sought was compared with a reference illumination level thereby to determine the temperature of the object. This scheme, while familiar and accepted, suffered from the disadvantage that it was incapable of measuring temperatures within a substance. Thus, a melt of steel could be measured only, insofar as temperature is concerned, at the surface of the steel.

Now, both the optical pyrometer and the thermocouple suffered in one degree or another from the fragile nature of the sensing element required in either of the above-noted schemes for measuring temperature. A relatively high casualty rate had to be accepted for the sensing elements whenever they were employed in the demanding environment of industrial processing. Even further, the temperature sensing elements of both the pyrometer and the thermocouple have been relatively expensive and the temperature range with which such elements may be employed is limited.

Even further, the employment of such elements as the thermocouple has been precluded in environments of high electrical fields, such as those found commonly in industrial processing establishments. This followed from the fact that stray induced potentials in such thermocouple elements have derogated temperature indicating potentials in these elements insofar as accurate temperature indication is concerned.

Still further, the employment of these sensing elements of the past has been severely prejudiced in the measurement of temperatures in severe environments where the composition of the quantity whose temperature is sought must be regulated rigorously. Thus, the temperature sensing element itself has contributed to the contamination of the quantity whose temperature is sought to be measured. Conversely, the temperature sensing element itself has been attacked in the past by the very substance sought to be measured. Thus replacement of a relatively expensive temperature sensing element became necessary.

Accordingly, it is a principal object of the invention to provide a temperature sensing system having a temperature sensing element which is relatively inert to attack by severe industrial environments.

It is a further object of the invention to provide a temperature sensing system having a sensing element which is immune to environmental electrical fields.

It is a further object of the invention to provide a temperature sensing system of extended high temperature range capability.

It is a still further object of the invention to provide a temperature sensing system having a low cost sensing element.

It is a still further object of the invention to provide a temperature sensing system having a sensing element which is free from the danger of contaminating the subject of the measurement.

It is a still further object of the invention to provide a low cost ceramic sensing element in association with an acoustic signal generator for determining the relative propagation velocity of sound in the ceramic sensing element to establish the temperature of that sensing element.

It is a still further object of the invention to provide a sensing element having two sound reflective portions spaced a predetermined distance apart in the sensing element.

It is a still further object of the invention to provide apparatus for indicating the difference in time of arrival of acoustic signals reflected respectively from the aforementioned spaced apart reflecting portions.

The invention will be more clear and other objects, features and advantages thereof will become apparent from a consideration of the following brief description of illustrative embodiments of the invention shown in the drawings and from a consideration of the appended claims.

In the drawings:

FIGS. 5 and 6 are block diagrams of alternative systems for employment with a temperature sensing element in accordance with the invention.

The invention comprises generally a substantially uniform cross-section rod having predetermined acoustic propagation characteristics. One end of the rod is adapted for mounting in a suitable structure for mating with an acoustic signal transducer. The other rod end is adapted for insertion in a medium whose temperature is sought. Between these two ends a notched portion of dissimilar cross-section is positioned a predetermined distance from the second or terminal end of the sensing rod. Thus two points of acoustic propagation discontinuity are established along the rod, a predetermined distance apart.

A substantially conventional acoustic pulse generator is provided in association with the aforementioned transducer for propagating successive pulses along the rod for reflection from the aforementioned spaced apart points of acoustic propagation discontinuity, from both the notched rod portion and from the terminal, end portion. Appropriate apparatus is connected in association with the transducer for receiving the two acoustic pulse signals reflected from this notched portion and from the terminal, end portion of the rod. These latter two portions together define a fixed sensing distance for the rod. The aforenoted sensing element in accordance with the invention is arranged for generating a signal upon the reflection of the signal from the transducer from both the sensing end of the rod and from the notched portion thereof. Appropriate apparatus is provided for measuring the time difference of the two signals so reflected.

Figure 1:
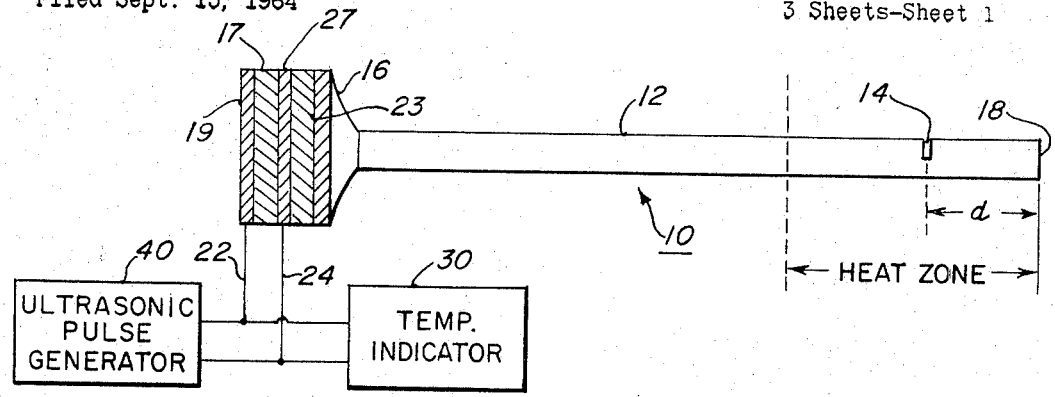
FIG. 1 is a partial block diagram and elevation view of a temperature sensing system in accordance with the invention.

Referring now more particularly to the drawings, in FIG. 1, there is seen a temperature sensing arangement 10 in accordance with the invention. This arrangement comprises a sensing rod 12 of substantially uniform cross-sectional dimension. This rod 12 is constructed of Hafnium Carbide though, in accordance with the invention, this rod may with advantage be constructed of any material selected from the below listed two tables in which there are tabulated, in Table 1, a list of suitable metals with associated melting points and in Table 2 a similar list of ceramic materials:

TABLE 1

| Metal: | Melting point ° F. |
| --- | --- |
| Tungsten | 6100 |
| Rhenium | 5700 |
| Tantalum | 5400 |
| Molybdenum | 4750 |
| Osmium | 4600 |
| Iridium | 4450 |
| Boron | 4200 |
| Zirconium | 4000 |
| Columbium | 3600 |
| Ruthenium | 3600 |

TABLE 2

| Ceramic: | |
| --- | --- |
| Hafnium carbide | 7030 |
| Tantalum carbide | 7020 |
| Hafnium boride | 5880 |
| Thoria | 5790 |
| Zirconium carbide | 5780 |
| Titanium carbide | 5700 |
| Tantalum boride | 5610 |
| Zirconium boride | 5500 |
| Boron nitride | 5430 |
| Titanium diboride | 5400 |
| Titanium nitride | 5325 |
| Urania | 5200 |
| Silicon carbide | 5160 |
| Magnesia | 5070 |
| Zirconia | 4930 |
| Tungsten carbide | 4800 |
| Beryllia | 4620 |
| Boron carbide | 4440 |
| Tantalum disilicide | 4350 |
| Molybdenum boride | 4080 |

The above listings of Table 1 and Table 2 are not exhaustive and it is clear that in accordance with the invention, this rod 12 may be constructed of many other materials dependent upon the need to which this sensing element is put. Typically, in a severe atmosphere, the rod may be constructed of glass or any other suitable acoustic wave propagating material whose structural qualities meet the temperature measuring environment to which the rod must be subjected.

This rod includes a terminal end 18 and a mounting end 16 which will be considered hereafter in more detail. In addition, the rod includes a region 14 of non-uniform cross-section. As shown this region 14 is no more than a notch placed in the rod. This notched portion of the rod is spaced apart from the terminal end 18 of the rod by a predetermined distance $d$. These two regions constitute points of acoustic propagation discontinuities. These two points are included within a temperature sensitive rod portion as indicated by the label HEAT ZONE. The right hand portion of the rod 12 is adapted for insertion into an environment for which the temperature is to be monitored. The left hand end 16 of the rod 12 is mechanically connected with a suitable impedance matching, signal transducing, and mounting structure as considered in detail hereafter. Such signal transducing, impedance matching structures are considered in some detail from page 65 in Ultrasonic Technology, Richard G. Goldman, Rhinehold Publishing Corporation, New York, 1962. This end structure includes a simple metallic backing plate 19, a quartz disc 17, a metallic sandwiched disc 27, a fiberglass disc 23, all affixed to the left hand end portion of the rod 12. The lead 22 is affixed electrically to the quartz disc 17 by way of the backing plate 19 for driving alternating electrical currents through this quartz disc in a direction toward the opposite metallic disc 27 for establishing an alternating electrical field through the quartz disc to drive the disc into mechanical vibration in the direction of the longitudinal extent of rod 12. Lead 24 is similarly affixed to the conductive plate 27 at the right hand side of the quartz disc 17 and in series with the lead 22 by way of temperature indicator 30. Thus, these leads 22, 24 provide a path from an ultrasonic pulse generator 40 of the type well known in the art for applying short duration, ultrasonic pulses of electrical energy across the quartz disc 17. This quartz crystal, in consequence, is driven to vibration in a longitudinal direction, as seen in FIG. 1, to propagate acoustic pulses along the rod 12. As will be seen hereafter in consideration of other figures of the drawing, the lead 24 further provides the function of blanking the delicate circuit elements of the temperature indicator 30 upon the occurrence of high level pulses from the generator 40. Thus damage to that indicator is avoided.

Figure 2:
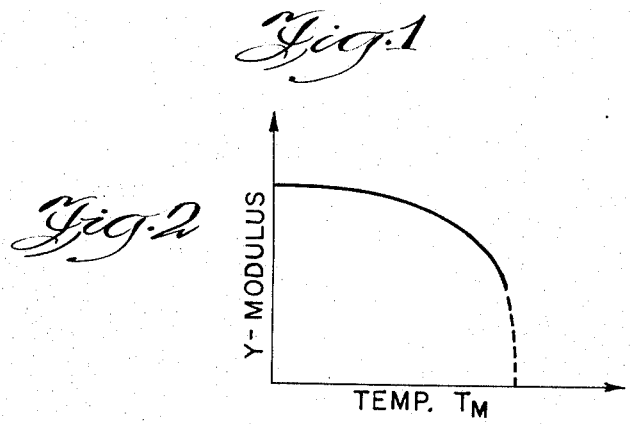
FIG. 2 is a curve of the variation of one material characteristic of a sensing element in accordance with the invention as the temperature of that element is raised.

Turning next to the diagram of FIG. 2, we see a graph of the behavior of the rod 12 under conditions of changing temperature. In this graph of FIG. 2, the ordinate is the Young's Modulus of a material of interest and the abscissa is the temperature to which this material is raised. The solid portions of the curve indicate that Young's Modulus for the material decreases with temperature along a non-linear curve. The dashed portions of the curve, terminated at $T_m$, indicated that, near the melting temperature $T_m$, the Young's Modulus of materials is not accurately known.

Now, if a pulse of acoustic energy be applied to a rod such as rod 12 in FIG. 1, it is propagated along that rod in accordance with the law given by expression (A) below:

(A)
$$C = \sqrt{\frac{Y_{(T)}}{\rho_{(T)}}}$$

In expression (A) above, C is the velocity of sound in the material of the rod 12, Y is the Young's Modulus of the material and a parenthesized (T) indicates that this Young's Modulus is variable with the temperature $\rho_{(T)}$ is similarly the density of material in the rod. Thus, we see that the velocity of sound in the rod 12, which is employed as a temperature sensing element in apparatus of the invention, is a square root function of the Young's Modulus of the material. As this Young's Modulus varies with temperature so the velocity of sound propagation varies. Similarly the acoustic propagation velocity is a square root function of the density of the material in the rod. As a practical matter, the Young's Modulus variations with temperature are of a magnitude to discount any variations in density of material. Accordingly, to a close approximation, we may consider that the velocity of sound varies directly as the square root of the Young's Modulus.

The structure in accordance with the invention turns this mathematical expression (A) above to structural account. As a pulse is launched from the generator 40, it is propagated along the rod 12. That portion of the rod indicated by the label HEAT ZONE propagates the acoustic pulse in an environment of the temperature to be indicated and the velocity of this propagation, is given by expression (A). Here the Young's Modulus of the material of rod 12 in the heat zone gives a direct representation of the temperature in that heat zone. As the acoustic pulse so propagated passes to the acoustic discontinuity 14, it is reflected in some measure back to the transducer end 16 of the rod 12. Some portion of the propagated acoustic pulse continues beyond the discontinuity 14 and is reflected from the terminal end 18 of the rod 12. Thus, there are two reflected pulses $P_1$, $P_2$ which are reflected along the rod 12 to the first end 16. Clearly, the time difference T of arrival of these reflected pulses $P_1$, $P_2$ at the rod ends 16 is given by the expression:

(B)  $T = 2d/C$

These two low level reflected pulses arrive at the transducer and are applied as electrical pulse signals to the temperature indicator 30 which is now enabled by action through lead 24 since the high level pulse in the generator 40 has ceased. In the temperature indicator, the two pulses reflected to the left hand, first end 16 of the rod 12 are processed for suitable indication of the time difference of travel of the pulses and consequent indication of the temperature of rod 12 between the acoustic discontinuities 14, 18 which give rise to the two reflections.

Clearly, this time difference is reflective of the velocity of sound in traveling over the distance $d$ between acoustic discontinuities 14 and 18 in the rod 12. This distance being predetermined in accordance with the invention, straightforward calculation from expression (A) yields the temperature to which the rod 12 is exposed over the region $d$.

Figure 3:
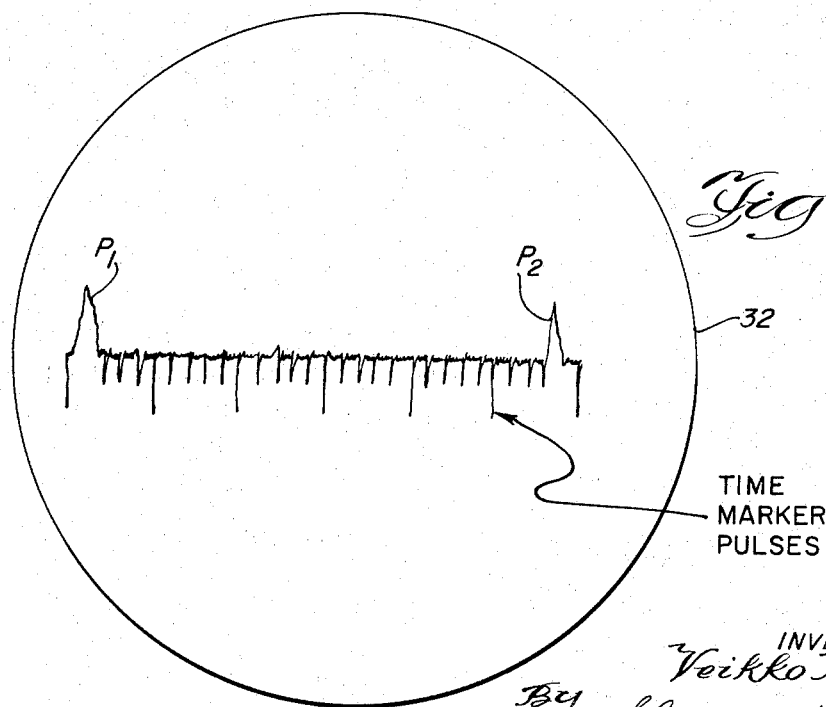
FIG. 3 is an elevation view of a familiar oscilloscope trace employed in indicating temperatures in a system in accordance with the invention.

Looking to FIG. 3, there is shown the face of an oscilloscope 32 for ready presentation of the time difference of arrival of the pulses $P_1$, $P_2$ reflected respectively from the notch 14 and the rod end 18, as illustrated. The first, left hand pulse represents the pulse $P_1$ arriving from the reference notch 14 and the right hand pulse $P_2$ represents the echo pulse from the rod end 18. The illustrated time markers on the cathode ray trace, clearly provides a ready measure of the time difference between the arrival of these reflected pulses and, thus, of the temperature of the rod 12 between the discontinuities 14 and 18. Suitable calculations from expression (A) above readily yield dimensional significance to these time marker pulses and, in turn, these time marker pulses yield direct temperature indication for that segment of the rod 12 which is indicated by $d$.

Figure 4:
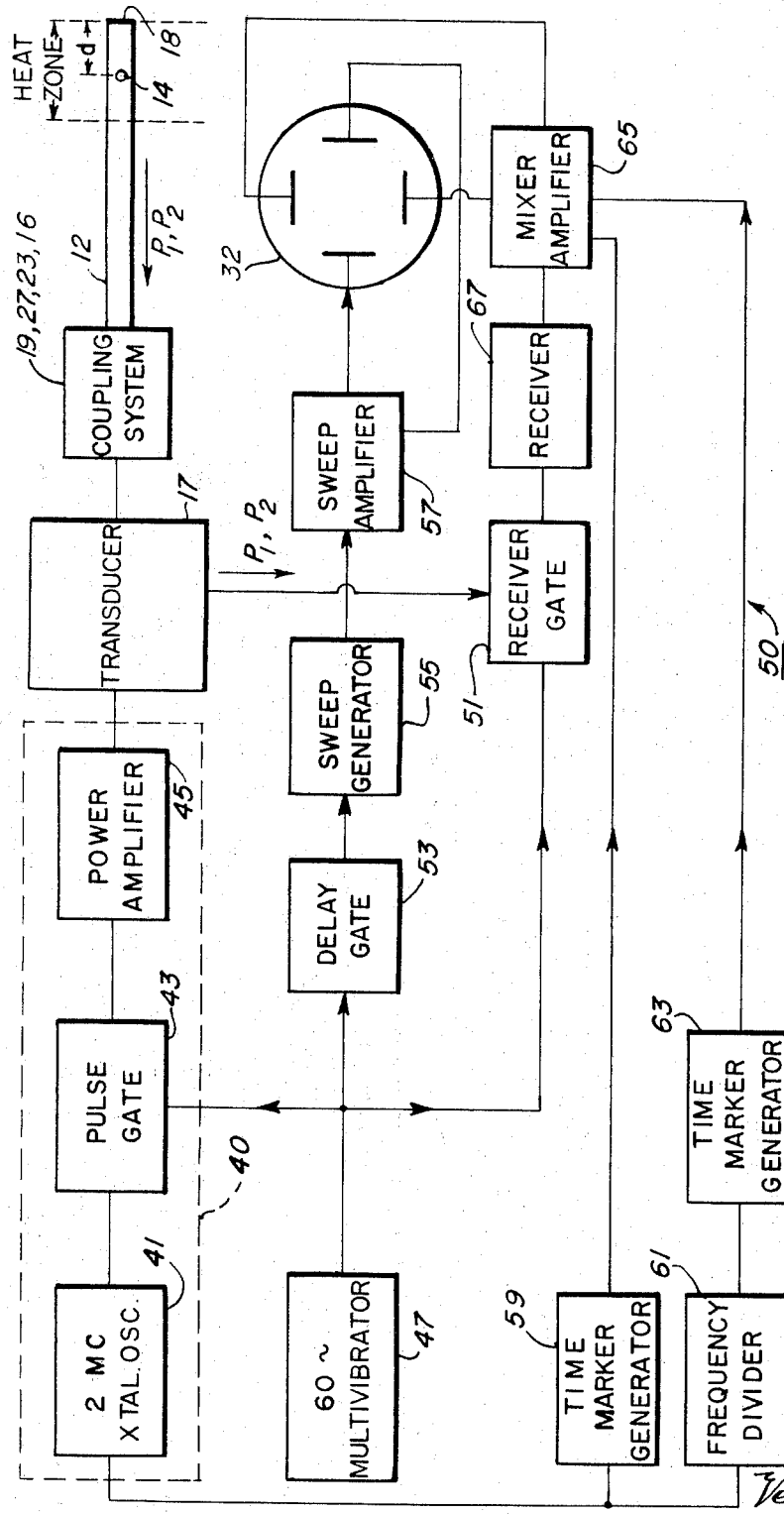
FIG. 4 is a block diagram of a temperature sensing system in accordance with the invention.

Turning next to FIG. 4, there is seen in block diagram a functional arrangement 50 which includes a pulse generator 40 connected to temperature indicating elements and, as well, a temperature sensing rod 12, for mutual cooperation. In this block diagram 50, reference numerals corresponding to those of FIG. 1 have been employed for relating the various structural elements one to the other between these two figures. In this diagram of the system 50, the principal component blocks of the generator 40 are shown enclosed with dashed lines but other cooperating elements of the temperature indicator and rod 12 are not enclosed specifically. Clearly, one skilled in the art is well acquainted with details of the structures of the several component blocks shown in FIGS. 4, 5 and 6 and recognizes that selected several ones of them may be advantageously enclosed in convenient housings adapted to the particular application of a system in accordance with the invention.

In any event, looking to the illustrative component block arrangement of this particular diagram, a two megacycle crystal oscillator 41 provides a train of oscillatory electrical signals to a pulse gate 43 for controlled passage to a power amplifier 45. This control is exercised, as shown, by a 60-cycle multi-vibrator 47 for opening gate 43 in a fashion, well known in the art, for a period of ten microseconds, every 1/60 of a second. At the same time, this 60-cycle multi-vibrator provides a signal to a receiver gate 51 to disable this gate. The signal of the 60-cycle multi-vibrator 47 is supplied thirdly to a delay gate 53 which is adjustable suitably for convenient initiation of a sweep generator signal by the generator 55. This signal is passed through the amplifier 57 to the horizontal deflection plates of the cathode ray oscilloscope 32. The sweep generator 55 is any one of such well known in the art and is adjustable such that the horizontal sweep on the oscilloscope 32 corresponds in time just prior to the arrival of a vertical deflection signal on the appropriate plates of this oscilloscope to represent a return echo from the indicating rod notch 14.

From the power amplifier 45, the multivibrator 47 thus selects a pulse of oscillatory energy from oscillator 41 for amplified propagation along rod 12 through transducer 17. Here this signal is translated from an electrical oscillation to a mechanical vibration. From the transducer 17 this mechanical vibration is coupled through an appropriate system including the components 19, 21, 23 to an indicating rod 12. Meanwhile, the continuous signals from the crystal oscillator 41 are applied to trigger time marker generators 59 and 63. The latter generator is triggered by way of a frequency divider 61 in order to provide markers for large intervals of time. These time marker signals are applied through a mixer amplifier 65 as shown to the vertical deflection plates of the oscilloscope 32.

Now, absent a pulse from the gate 43, corresponding to an output signal to the power amplifier 45, the receiver gate 51 is opened. Thus electrical signals from transducer 17 are translated through this gate to a receiver 67 for passage to mixer amplifier 65 and further application to the vertical deflection plates of the oscilloscope 32 as illustrated.

Thus, the overall operation of the system diagrammed in FIG. 4 and designated 50 appears. Pulses of oscillatory electrical energy are amplified and passed periodically to the transducer 17 through a coupling system as illustrated. These mechanical transducer signals are translated along the rod 12. Coincident with each of these pulses from the amplifier 45, all delicate receiving circuitry is disabled. The pulse so propagated along the rod 12 progresses toward the end of that rod 18. In the course of this progress, a portion of the energy of this pulse is reflected from an acoustic propagation discontinuity 14 in the rod 12. Now, the pulses reflected from the discontinuity 14 and the rod end 18 are spaced apart in time in accordance with the temperature of the heat zone and the fixed distance $d$ between points 14 and 18. Thus, these pulses, $P_1$, $P_2$ arrive at the transducer 17 spaced apart in time by an amount corresponding to the spacing of the discontinuities 14 and 18 in the rod 12. Now, the fixed spacing of these two discontinuities determines the time spacing of the two reflected pulses in accordance with the velocity of acoustic transmission in the intervening rod interval, the distance $d$ as illustrated. This intervening interval is disposed, in accordance with the invention, in an area having a temperature of interest for measurement purposes. Clearly the velocity of propagation between the discontinuities 14 and 18 is a function of the temperature in this region under investigation. Thus, the two reflected time spaced pulses are applied through the receiver gate 51 to a receiver 67 and applied to pass through mixed amplifier 65 to the vertical deflection plates of the oscilloscope 32. At the oscilloscope these spaced apart pulses give direct visible indication of the time of occurrence of these reflected pulses. Clearly the time marker generators 59 and 63 provide, on this same oscilloscope, reference time markers to indicate the time spacing of the reflected pulses. As has been noted in connection with expression (A) considered heretofore, the time spacing of these pulses on oscilloscope 32 may give direct representation of the temperature of the environment into which the rod portion between discontinuity 14 and 18 is placed. Clearly, the markers positioned on the oscilloscope 32 from the generators 59 and 63 may give a direct indication of this temperature with resort to equation (A). Alternatively, of course, as is well known to those skilled in the art, a time scale calibrated directly in temperature may be placed on the oscilloscope 32 for direct reading of temperature.

Turning next to FIG. 5, there is seen an alternative system in block diagram for employment with the structure of FIG. 1. In the block diagram of FIG. 5, the system 70 is illustrated with designating numerals corresponding to those of FIGS. 1, 2 and 4. A pulse generator 40 is shown in dashed outline. This pulse generator, as in the block diagram of FIG. 4, comprises a two-megacycle crystal oscillator.

In the system illustrated in FIG. 5, a starting pulse generator 87 is operated by a hand switch 88. The starting pulse generator 87 corresponds to the 60-cycle multi-vibrator 47 of FIG. 4. This generator 87 is operated manually by a starting switch 88. Thereafter, this starting pulse generator produces a signal for passage to receiver gate 51 and to pulse gate 43. The one signal opens the pulse gate 43 to pass signals from the oscillator 41 for a predetermined period of time, thus, to deliver a two-megacycle pulse of energy to the power amplifier 45. At the same time, the receiver gate is placed in a disabled condition to preclude passage of signals from the transducer 17 to the receiver.

Similar to the system of FIG. 4, the pulses of high frequency electrical energy are applied to a transducer 17 for coupling as mechanical acoustic energy to the sensing rod 12. This pulse of ultrasonic mechanical energy is propagated along the rod 12 to a terminal end 18 past a physical discontinuity 14 which is placed in the rod a distance $d$ from the end 18 of the rod. The discontinuities 14 and 18 define together a sensing portion of the rod for insertion into a temperature zone to be investigated. The disabling pulse from the generator 87 to the receiver gate 51 is operated for a predetermined length of time corresponding to the duration of the pulse passed by gate 43. Thereafter, the receiver gate is conditioned to pass reflected pulses $P_1$, $P_2$, which pass to the left from the discontinuities 14 and 18 respectively, in the sensing rod 12 to the coupling system 19, 21, 23, 16 on this rod. Thence, these reflected acoustic signals pass through the transducer as the electrical signals $P_1$, $P_2$ to the receiver gate 51. The receiver gate, having been enabled upon the passage of a predetermined time from the application of a starting pulse thereto from the starting pulse generator 87, now passes signals to the receiver 67 and to an amplifier 165. Thence, the amplified electrical signals $P_1$, $P_2$ are applied to a clipper 166 of the type well known in the art for reduction to a common amplitude level. The so clipped signals are applied to open and close a counter gate 167. This gate in the open condition allows passage of 100 megacycle timing pulses from oscillator 141, of the type well known in the art, for supplying counting pulses to a counter 132. Thus, this counter gives a direct numerical indication of the time interval between arrival of reflected pulses $P_1$, $P_2$ at the transducer 17. Consequently, the counter 132 gives, through Equation A, a direct indication of velocity of sound and so, the temperature of the rod 12 between discontinuities 14, 18.

Turning next to FIG. 6, here is seen an indicating system remarkably similar to that of FIG. 5, but having important structural advantages for effecting a direct reading of temperature from acoustic signal sensing arrangements in accordance with the invention. As in previously considered figures, the pulse generator 40 is illustrated enclosed in dashed lines and includes a crystal oscillator 41, a pulse gate 43 and a power amplifier 45. From the power amplifier signals are coupled to an electro-acoustic transducer 17 and through a suitable mechanical coupling system 19, 21, 23, 16 to a rod 12 for propagation therealong. This rod of FIG. 6 as in the case of FIGS. 1, 4 and 5 includes a discontinuity 14. In this case, a drilled hole is spaced a fixed distance $d$ away from the termination 18 of the rod 12. Both the termination 18 and the discontinuity 14 are included within a temperature sensing portion of the rod 12 as indicated. Operation of the system of FIG. 6 is initiated by a 60-cycle multi-vibrator 47 which periodically applies signals to the pulse gate 43 to allow passage of ultrasonic signals from the crystal oscillator 41 to power amplifier 45. The enabling signal passed from the multi-vibrator 47 to the gate 43 also serves to disable receiver gate 51 for a predetermined period, corresponding to the duration of the pulse passed by the gate 43, to preclude the passage of a heavy output signal from the amplifier 45 to damage receiver 67.

Thereafter, the acoustic pulse signals $P_1$, $P_2$ are reflected from the discontinuities 14, 18 in the rod 12 for conversion to electrical pulses $P_1$, $P_2$, to the receiver gate 51. This gate is now enabled by simple passage of time, after the occurrence of a pulse from multivibrator 47, in appropriate, well known delay circuits included in gate 51. Thus, the electrical pulses resulting from acoustic reflections from the discontinuities 14, 18 are passed to receiver 67, to a suitable amplifier 165 and to a clipper 166. Comparison of designating numerals between this FIG. 6 and the previously discussed FIG. 5 demonstrates, of course, that, to the clipper 166, operation and structure of the two arrangements are substantially the same. The electrical signal corresponding to the first received echo pulse $P_1$ serves to open a ramp generator gate 171 and to pass this signal to a substantially conventional generator 172 for initiation of a suitable ramp, as is well known in the art. This ramp generator 172 applies an increasing signal to a peak volt meter 173. To this meter, there is connected a meter suppresser circuit 174 for applying a suppression signal to the volt meter 173 in correspondence with the low end range of the meter. Thus, in accordance with this embodiment of the invention, the peak reading volt meter is automatically calibrated to read the temperature to which the right hand end of rod 12 is subjected. This peak reading of the volt meter 173 is appropriately calibrated so that this meter reads directly the temperature to which this rod 12 is subjected.

In using the apparatus, means for mechanically protecting the end of rod 12 may be used. A hollow sheath of ceramic material, cast iron, aluminum oxide, silicon carbide or the like extends into the high temperature zone, and the rod is inserted into the interior, packed in powdered ceramic material. It is not believed necessary to illustrate this, since the technique is well-known.

There have been discussed heretofore various arrangements by which the principles of the invention can be employed advantageously for the determination of temperature. It is clear that, without departing from the spirit and scope of the invention, numerous and varied embodiments may be effected by one skilled in the art.

What is sought to be secured by Letters Patent in the United States is set forth in the appended claims.

What is claimed is:

1. A pyrometer comprising:
    a solid heat sensing and responding element,
    said solid element having predetermined acoustic propagation properties which are a function of the temperature of said solid element,
    said solid element having a heating zone to be immersed in a region for monitoring temperature of the region,
    at least one pair of discontinuities contained in said heating zone and spaced apart a predetermined distance,
    a source of electric energy coupled to said solid element at a position remote from said heating zone,
    a transducer interposed between said energy source and said solid element and adapted to convert electric energy from said source to pulsed acoustic signals and vice versa,
    said solid element channeling each pulsed acoustic signal from said transducer to said discontinuities and conveying back to said transducer a pair of reflected signals,
    electronic temperature indicating means coupled to said transducer for receiving the transduced electrical energy result of said pair of reflected signals and deriving therefrom for temperature data readout the time separation therebetween,
the time receipt of said reflected signals being indicative of the temperature of the region being monitored, and gating means for coupling said transducer to said energy source and for simultaneously inhibiting said temperature indicating means from being influenced by said energy source.

2. A pyrometer as defined in claim 1 in which said solid element has a uniform cross section except for said discontinuities and in which said transducer comprises a unitary structure.

3. A pyrometer as defined in claim 1 in which
said source of electrical energy is a generator of high frequency electrical signals which are transduced by said transducer into ultrasonic acoustic signals and further comprising,
a generator of low frequency pulsations coupled to said gating means for control thereof.

4. A pyrometer as defined in claim 1 in which said gating means comprises:
a first gating element interposed between said electrical energy source and said transducer,
a second gating element interposed between said transducer and said temperature indicating means, and
a control pulse generator coupled to a discrete input of each said gating element.

References Cited

UNITED STATES PATENTS

| | | | |
|---|---|---|---|
| 2,280,226 | 4/1942 | Firestone | 181—0.5 X |
| 2,575,759 | 11/1951 | Higinbotham et al. | 324—68 |
| 2,935,682 | 5/1960 | Gates | 324—68 |
| 3,006,184 | 10/1961 | Goldman | 73—67.8 |
| 3,137,169 | 6/1964 | Clement et al. | 73—339 |
| 3,186,226 | 6/1965 | Milnes et al. | 73—339 |

FOREIGN PATENTS

| | | |
|---|---|---|
| 632,102 | 12/1961 | Canada. |
| 149,640 | 11/1961 | U.S.S.R. |

LOUIS R. PRINCE, *Primary Examiner.*

F. SHOON, *Assistant Examiner.*